(12) United States Patent
Li

(10) Patent No.: US 10,917,653 B2
(45) Date of Patent: *Feb. 9, 2021

(54) ACCELERATED RE-ENCODING OF VIDEO FOR VIDEO DELIVERY

(71) Applicant: HULU, LLC, Santa Monica, CA (US)

(72) Inventor: Xiaocheng Li, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,472

(22) Filed: Oct. 21, 2019

(65) Prior Publication Data

US 2020/0053370 A1 Feb. 13, 2020

Related U.S. Application Data

(63) Continuation of application No. 15/836,501, filed on Dec. 8, 2017, now Pat. No. 10,469,859.

(51) Int. Cl.
| | |
|---|---|
| *H04N 19/40* | (2014.01) |
| *H04N 19/513* | (2014.01) |
| *H04N 19/176* | (2014.01) |
| *H04N 21/234* | (2011.01) |
| *H04N 21/81* | (2011.01) |
| *H04N 21/45* | (2011.01) |
| *H04N 19/91* | (2014.01) |

(52) U.S. Cl.
CPC ........... *H04N 19/40* (2014.11); *H04N 19/176* (2014.11); *H04N 19/521* (2014.11); *H04N 21/23424* (2013.01); *H04N 21/4524* (2013.01); *H04N 21/812* (2013.01); *H04N 19/91* (2014.11)

(58) Field of Classification Search
CPC ..... H04N 19/40; H04N 19/521; H04N 19/176
See application file for complete search history.

(56) References Cited

U.S. PATENT DOCUMENTS

| | | | | |
|---|---|---|---|---|
| 10,469,859 B2 * | 11/2019 | Li | ......................... | H04N 19/521 |
| 2007/0140358 A1 * | 6/2007 | Schwartz | ............. | H04N 19/152 |
| | | | | 375/240.26 |
| 2008/0068500 A1 * | 3/2008 | Krause | ................. | H04N 21/435 |
| | | | | 348/473 |
| 2011/0314493 A1 * | 12/2011 | Lemire | ............ | H04N 21/23424 |
| | | | | 725/32 |
| 2015/0281746 A1 * | 10/2015 | Lam | ..................... | H04N 21/231 |
| | | | | 725/116 |
| 2016/0247423 A1 * | 8/2016 | Hohl | .................... | G11B 27/036 |
| 2019/0182494 A1 | 6/2019 | Li | | |

* cited by examiner

*Primary Examiner* — Shawn S An
(74) *Attorney, Agent, or Firm* — Fountainhead Law Group P.C.

(57) ABSTRACT

In some embodiments, a method receives an encoded video and decodes blocks in a frame of the encoded video in which replacement content will be inserted. The blocks are analyzed to determine first blocks of the frame that are affected by insertion of the replacement content and second blocks in the frame that are not affected by the insertion. Information from the decoding of the block is saved for the second blocks. The frame is encoded where the replacement content is inserted to replace the first blocks in the encoding of the frame, and wherein the information from the decoding of the second blocks is reused when performing the encoding of the second blocks.

20 Claims, 9 Drawing Sheets

ACCELERATED RE-ENCODING OF VIDEO FOR VIDEO DELIVERY

CROSS REFERENCE TO RELATED APPLICATIONS

This application is a continuation application and, pursuant to 35 U.S.C. § 120, is entitled to and claims the benefit of earlier filed application U.S. application Ser. No. 15/836,501 filed Dec. 8, 2017, the content of which is incorporated herein by reference in its entirety for all purposes.

BACKGROUND

A video delivery service may insert advertisements (ads) in content that is delivered to users in different locations. One method of inserting the ads into the content is to break up the content with ad breaks and insert video ads in the ad breaks. The ad breaks may be full-screen ads that include the advertiser content. These full-screen ads may be expensive to produce, however. Additionally, the ad breaks may disrupt the viewing experience for the user by interrupting the viewing of the video content, such as the show or movie being watched.

The users that are viewing the video are located in different locations. Sending the same ad to all the users may not show each user the most relevant ad possible. For example, some ads may be more relevant to users in a first location than to users in a second location. However, the advertisers may not have a choice as to who is offered the advertisement. Further, by only providing advertisements to all users, some regional advertisers may not want to advertise on the video delivery service because their ad may not be relevant to large portions of the video delivery service's users.

DETAILED DESCRIPTION

Figure 1:
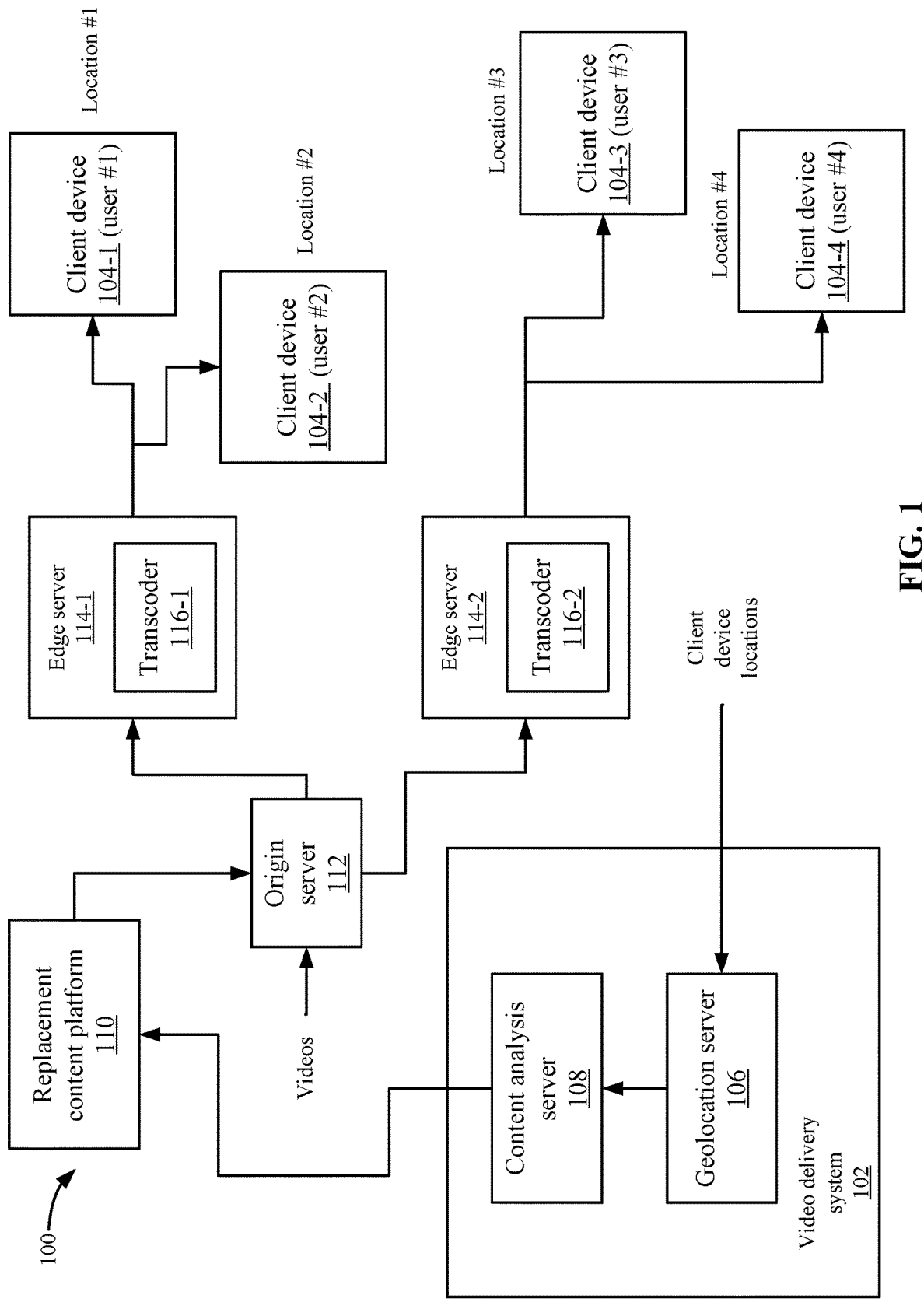
FIG. 1 depicts a simplified system for delivering video with replacement content according to some embodiments.

Described herein are techniques for a transcoding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments distribute video to client devices for users located in different locations. For example, users may be using client devices in different defined areas, such as in different cities, regions, zip codes, etc. A video delivery system may receive the locations for the client devices and determine replacement content that is used to replace content in the videos. For example, the video delivery system may analyze the content of the video to determine replacement areas in the videos. The replacement areas may be defined by a time period in the video and an area in the images of the video. For example, there may be areas in the images during a number of frames of the video, such as a billboard or product in which replacement content can be inserted. For example, an advertisement may be inserted and replace the content in a billboard in the video.

The video delivery system may determine different replacement content for different locations. For example, advertisements may be targeted to different location region, such as an advertiser in the northeastern region may want to display an ad to users that are only located in the northeastern region. The video delivery system provides a platform that allows a content delivery network (CDN) to deliver the location-based replacement content in videos. For example, the system may define the content replacement areas, which may include a time period and an area in images in the video. Then, the system can specify which replacement content should be inserted into the content replacement areas for different locations.

When sending videos to client devices, servers, such as edge servers, receive an encoded video and determine if any replacement content for their location is applicable while delivering the video to users. If so, then the edge server may decode portions of the encoded video, insert the replacement content in the replacement areas, and then re-encode the video. The edge server then sends the encoded video with the replacement content to applicable client devices.

When performing the replacement in real-time while delivering the video to client devices, the edge server decodes a portion of the video, replaces content in the video with replacement content, and then re-encodes the portion of the video without disrupting the user's viewing experience. The edge server may perform this process as quickly as possible to avoid experiencing any disruptions in the video delivery. Accordingly, some embodiments provide an encoding and decoding process that can re-use motion prediction information, which may include a macroblock type and/or motion vector. For example, a frame of video may include a large amount of macroblocks, which the transcoder can determine as different macroblock types, such as intra-frame, inter-frame and bi-direction inter-frame macroblock types. Also, these macroblocks also include motion vectors that are used in the prediction process. Given that the replacement content will replace some of the macroblocks in a frame, but not all the macroblocks, the transcoder may determine during the decoding process the macroblock type that was used and may also determine the motion vector for macroblocks that are not affected by the replacement. Then, when re-encoding the frame, the macroblock type and motion vector can be re-used. However, for macroblocks affected by the content replacement, the transcoder can re-compute the macroblock type and motion vector. However, re-using some of the macroblock type and motion vector information saves a large amount of computation time for the transcoder.

FIG. 1 depicts a simplified system 100 for delivering video with replacement content according to some embodiments. System 100 includes a video delivery system 102 and client devices 104. Additionally, system 100 may include a content delivery network (CDN) that may include an origin server 112 and edge servers 114. A replacement content platform 110 may provide the replacement content to the content delivery network, but other systems may deliver the replacement content to the content delivery network.

Video delivery system 102 may deliver video to client devices 104. Video delivery system 102 may use different protocols to encode the video and a person skilled in the art will appreciate different protocols may use different terms, such as a frame may be referred to as a picture or image, and a macroblock may be a block in the frames.

Client devices 104 may include various devices that can view videos, such as mobile devices, set top boxes, game consoles, streaming devices, etc. Client devices 104-1 to 104-4 may be located in different locations and may be used by different users. For example, client devices 104-1 to 104-4 may be located in locations #1, #2, #3, and #4, respectively. The different locations may be defined by various characteristics, such as by location information that is defined by the Internet protocol (IP) address of client devices 104, global positioning satellite (GPS) information, or user profile information (e.g., a user's home address).

A geolocation server 106 receives the client device locations and may classify the locations into geolocation groups, which may be defined as a ZIP code or set of ZIP codes. In some embodiments, geolocation server 106 may generate the geolocation groups dynamically based on a clustering of the locations received from active users. For example, geolocation server 106 receives the location information from active users that requested (and are viewing or will be viewing) a video and can then cluster the users into different groups using a clustering algorithm. This may create different geolocation groups with a certain number of users. The geolocation group may include users that are considered geographically near each other, such as by a threshold or within a set of zip codes. The generation of real-time geolocation groups allows targeting to users that are currently within a location. For example, ads can be delivered to users that are within ten miles of a restaurant. Additionally, the geolocation groups may be static, such as static groups of a set of ZIP codes, and the users are classified into the different geolocation groups when their respective geolocation information matches the characteristics of one of the groups, such as a user's location matches a zip code of a group. Geolocation server 106 may dynamically determine the geolocation groups because the content replacement is a computationally expensive operation and if there are no users in the geolocation group or a sufficient number of users that requested the video is above a threshold, then the content replacement may not be performed.

A content analysis server 108 may analyze the videos being offered by the video delivery service to determine replacement content areas that define where replacement content can be inserted in the video. For example, the areas may define insertion points and replacement content areas in the images. The replacement content insertion points may be a time period, such as a time period in the video (from 1:01 to 1:02) or the frame number, such as frames #100, #101, and #102. Content analysis server 108 may use different detection tools to detect the points to insert the content, such as using face detection and object detection to detect faces or objects that can be replaced. Content analysis server 108 may also dynamically determine the insertion points in the videos. For example, depending on the geolocation groups that are active, content analysis server 108 may want to determine different content to replace. In some examples, an advertiser may want to replace content only when there are a large number of users in a certain location and may specify requirements for the replacement content areas. The replacement content for this advertiser may include certain dimensions, and content analysis server 108 may analyze the video to determine a content replacement area that satisfies the replacement content specifications.

Also, content analysis server 108 may analyze the video before the video is sent to the users and can determine different content replacement areas that are possible. Then, when the videos are being played, different replacement content may be inserted in the content replacement areas.

Replacement content platform 110 receives the replacement content areas and geolocation groups from video delivery system 102. Replacement content platform 110 can then determine which content replacement areas should be replaced with which replacement content. Replacement content platform 110 may make this determination based on different factors. For example, replacement content may only be inserted into a video if a certain number of users are within a geolocation group that are viewing the video. Or, the ad is inserted only for users that are currently within a location, such as near a restaurant or other business.

An origin server 112 of the CDN may receive the videos to deliver to client devices 104. In some embodiments, origin server 112 may encode the video without the replacement content. Alternatively, the video received at origin server 112 may already be encoded. Then, origin server 112 sends the encoded content to edge servers 114-1 and 114-2, which may be in different locations. Edge servers 114 are located on the edge of the CDN and used to deliver the content to client devices 104. For example, edge server 114-1 may be close to location #1 and location #2 and edge server 114-2 may be close to location #3 and location #4. That is, edge server 114-2 is closer to locations #3 and #4 than locations #1 and location #2 and vice versa for edge server 114-1. Although origin server 112 and edge servers 114 are described, different structures for content delivery networks will be appreciated, such as origin servers may not be used.

Origin server 112 may provide edge servers 114-1 and 114-2 with an indication if content should be replaced in the videos. In another embodiment, replacement content platform 110 may send the indications directly to edge servers 114-1 and 114-2.

When no content replacement is performed, edge servers 114-1 and 114-2 may forward the encoded video to client devices 104-1 and 104-2 and 104-3 and 104-4, respectively, without decoding the video. However, when replacement content is being inserted into the video, edge servers 114 include transcoders 116 that can decode portions of the video, insert the replacement content, and then re-encode the portions of the video. In some embodiments, edge servers 114-1 and 114-2 perform the decoding and encoding of the portions of video in real-time as the encoded video is received. For example, origin server 112 may provide segments of the video to edge servers 114-1 and 114-2, which then provide the segments to client devices 104. When receiving the segments, edge servers 114-1 and 114-2 decode the portions of the video in which replacement content will be inserted, insert the replacement content, and then re-encode the video. Then, edge servers 114-1 and 114-2 send the videos with the replacement content to respective client devices 104. For example, edge server 114-1 may send the video with first replacement content to client devices 104-1 and 104-2 and edge server 114-2 may send the video with second replacement content to client devices 104-3 and 104-4.

Transcoders 116-1 and 116-2 to perform the decoding, replacement, and encoding efficiently to avoid disruption to the user's viewing experience, such as jitter or buffering of the video should be avoided. As will be described in more detail below, transcoders 116-1 and 116-2 may not re-encode all frames in the video, but only the portion of frames that are affected by the replacement content. Further, transcoders 116-1 and 116-2 may re-use motion prediction information, such as macroblock type and motion vectors when re-encoding certain macroblocks that are not affected by the replacement content. The macroblocks affected by the replacement content may have their macroblock type and motion vectors recalculated. However, the replacement content may be in a limited region of the frame and thus not recalculating the motion prediction information for a large number of macroblocks in the frame may save a large amount of re-encoding time, such as two-thirds of the time.

VIDEO REPLACEMENT EXAMPLES

Figure 2A:
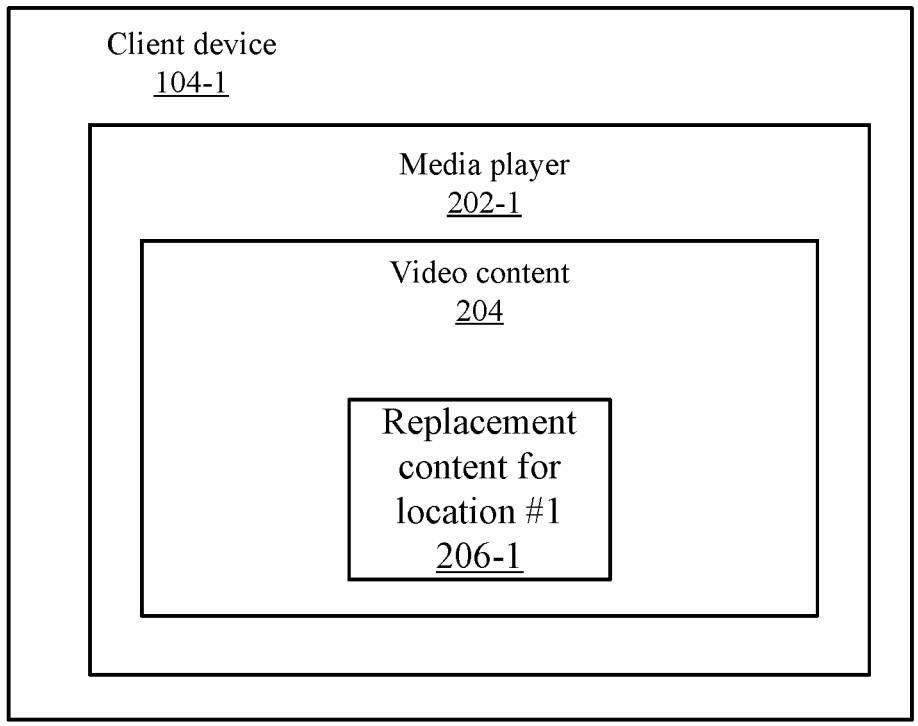
FIG. 2A depicts an example of a client device at location #1 according to some embodiments.
Figure 2B:
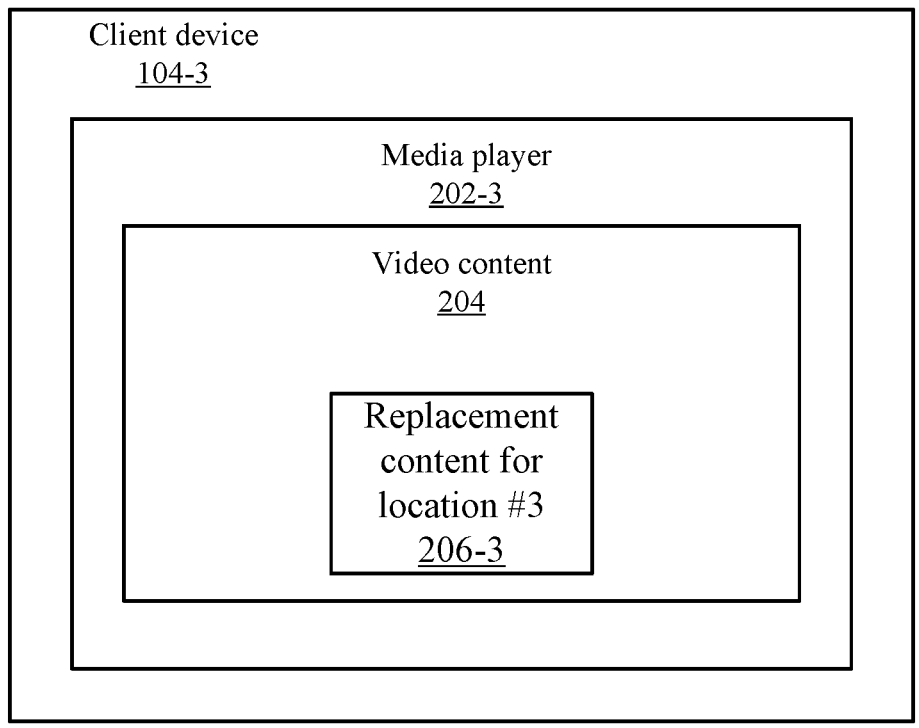
FIG. 2B depicts an example of a client device that is in location #3 according to some embodiments.

FIGS. 2A and 2B depict different examples of the video that are shown in different locations according to some embodiments. FIG. 2A depicts an example of client device 104-1 at location #1 according to some embodiments. Client device 104-1 includes a media player 202-1 that is playing video content 204. Video content 204 may be a movie, show, sporting event, or other content. Also, video content 204 may include replacement content 206-1 for location #1. For example, the replacement content may replace the original content in video content 204, such as content of a billboard may be replaced with an advertisement. The advertisement may be directed to users in location #1, such as the content may be for a local restaurant.

FIG. 2B depicts an example of client device 104-3 that is in location #3 according to some embodiments. Client device 104-3 includes media player 202-3 that is also playing video content 204. However, video content 204 includes replacement content for location #3. The replacement content may be an advertisement directed to location #3, such as another restaurant that is near location #3. Accordingly, edge servers 114 have replaced content in the video with different replacement content.

Content Replacement

Figure 3:
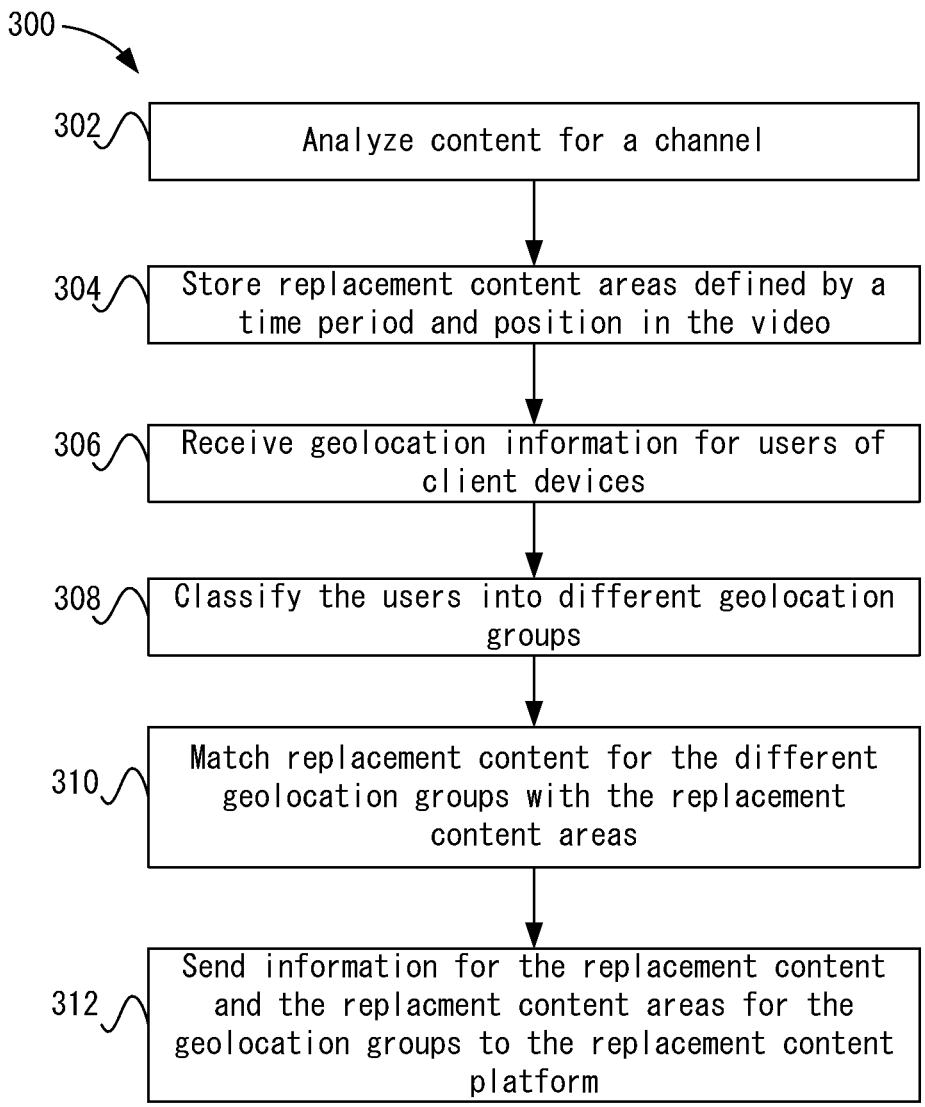
FIG. 3 depicts a simplified flowchart of a method for replacing content in videos according to some embodiments.

FIG. 3 depicts a simplified flowchart 300 of a method for replacing content in videos according to some embodiments. At 302, content analysis server 108 analyzes content for a channel. For example, video delivery system 102 may offer different content on different channels. Content analysis server 108 may analyze the content for videos offered on one or more of the channels. As discussed above, content analysis server 108 may analyze content to detect content replacement areas. Additionally, content analysis server 108 may receive specifications of content replacement areas, such as from the video delivery service or from advertisers.

At 304, content analysis server 108 stores the replacement content areas. In some embodiments, the replacement content areas may be defined by a time period and areas in images of the video. The time period as discussed above may include frame numbers and the areas in the images of the video may include macroblock identifiers in the frames.

At 306, geolocation server 106 receives geolocation information for users of client devices 104. Then, at 308, geolocation server 106 classifies the users into different geolocation groups. The geolocation information may be based on which videos are being offered on channels users are watching. Then, a breakdown of which users in which locations are watching which channels can be determined. Geolocation server 106 can then pass the geolocation groups to content analysis server 108.

At 310, content analysis server 108 matches replacement content for the different geolocation groups with the replacement content areas. Content analysis server 108 may select the replacement content areas based upon replacement content that could be inserted into the replacement content areas for the different geolocation groups. For example, if a certain geolocation group is represented, then replacement content for that geolocation group may be selected, such as an ad that is local to the geolocation group. Also, the characteristics of the replacement content may be taken into account in determining the replacement content areas. For example, if the geolocation group associated with a specific replacement content that fits within a certain size replacement content area, then content analysis server 108 selects replacement content areas in the video that meet the requirements of the replacement content. For example, content analysis server 108 may select a 32×32 replacement area if the replacement content size is 32×32 pixels. At 312, content analysis server 108 sends information for the replacement content and the replacement content areas for the video and the geolocation groups to replacement content platform 110.

Video Delivery Process

Origin server 112 receives the videos, such as from video delivery system 102, and can distribute the videos to client devices 104. In some embodiments, origin server 112 may encode the videos using an encoding protocol. For example, origin server 112 may segment the videos into segments, such as 2-10 second segments that can be requested by client devices 104. Although segment-based streaming protocols are discussed, other streaming protocols may be used that do not use segments may be used.

Origin server 112 can then distribute the encoded videos to edge servers 114-1 and 114-2. Although the use of origin server 112 and edge servers 114-1 and 114-2 is described, it will be understood that origin server 112 may perform the functions as described with respect to edge servers 114-1 and 114-2 or an origin server may not be used. When edge servers 114-1 and 114-2 receive the encoded video from origin server 112, edge servers 114-1 and 114-2 determine whether or not replacement content should be inserted into the encoded video.

Figure 4:
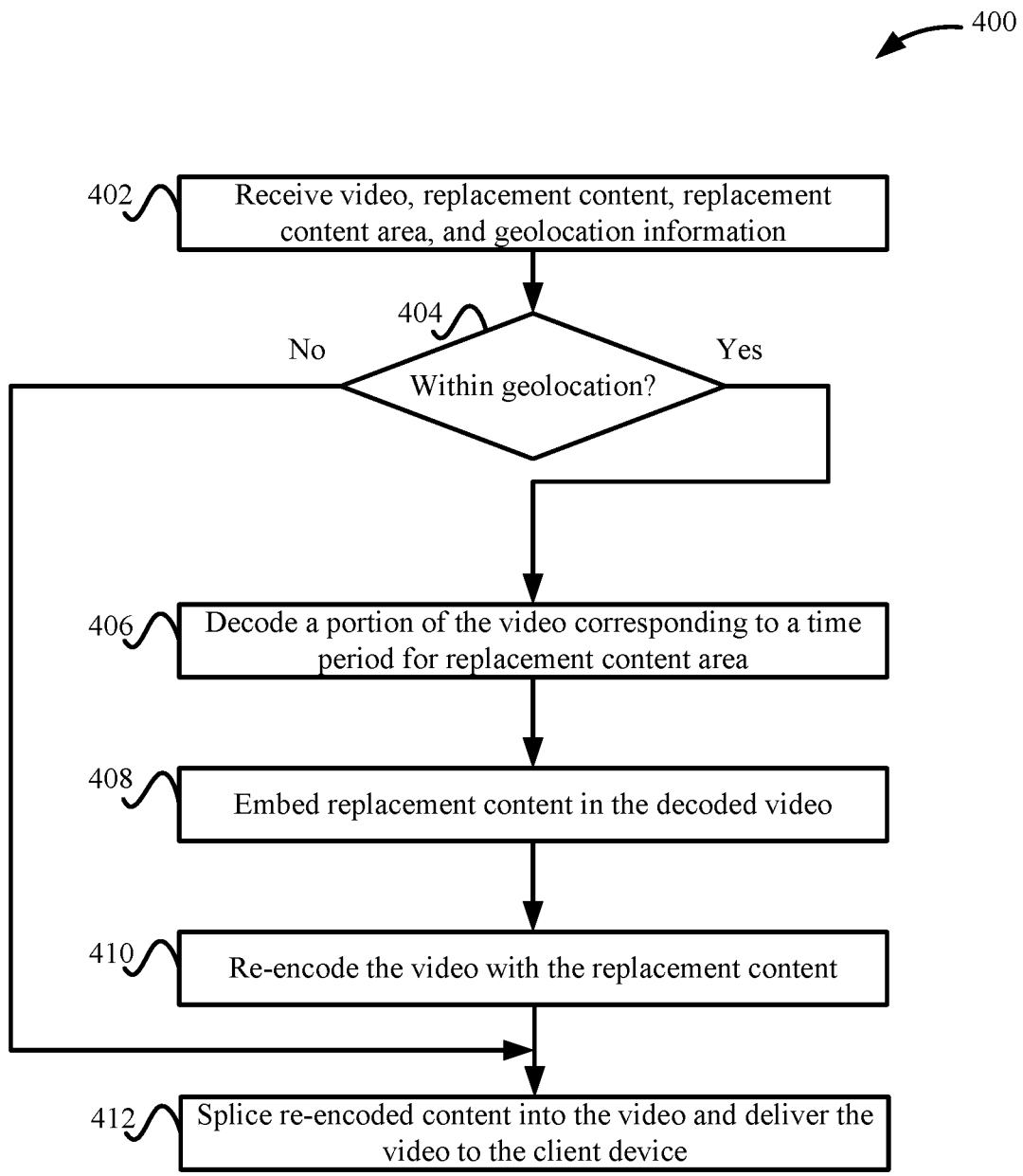
FIG. 4 depicts a simplified flowchart of a method for inserting replacement content into a video according to some embodiments.

FIG. 4 depicts a simplified flowchart 400 of a method for inserting replacement content into a video according to some embodiments. The process will be described with respect to edge server 114, but it will be understood that edge server 114-1 and/or 114-2 can perform the process. At 402, edge server 114 receives the video, replacement content, one or more replacement content areas, and geolocation information for the replacement content. In some embodiments, all edge servers 114 may receive the same replacement content, replacement content areas, and geolocation information. Then, edge servers 114 decide whether or not they are in the location in which specific replacement content should be inserted into the video. For example, geolocation information may identify client devices in location #1 should receive the replacement content. Also, the geolocation information may state that location #1 and location #2 should receive the replacement content. If location #1 is specified for the geolocation information, then when edge server 114-2 receives the replacement content, edge server 114-2 does not insert the replacement content because client device 104-3 is in location #3 and client device 104-4 is in location #4 which is not within location #1. However, edge server 114-1 determines that client 104-1 is within location #1. In other examples, edge servers 114 are defined by a location area, and if the geolocation information is within the location area, then edge server 114 may insert the replacement content in the video.

Accordingly, edge server 114 determines whether it is associated with client devices 104 that are within the geolocation area specified by the geolocation information. If the geolocation area applies to edge server 114, then at 406, transcoder 116 decodes a portion of the video corresponding to a time period for the replacement content area. For example, the replacement content area may specify the frame numbers or a time within the video in which the replacement content should be inserted. Transcoder 116 may determine that portion of the encoded video and decode only that portion of the video while leaving the other portions of the video in the encoded form.

At 408, transcoder 116 may embed the replacement content in the decoded video. For example, as will be described in more detail below, transcoder 116 may replace macroblocks in frames of the video with the replacement content.

At 410, transcoder 116 re-encodes the video with the replacement content. For example, transcoder 116 re-encodes the frames in the time period that include the replacement content. As will be discussed below, transcoder 116 may reuse motion prediction information for macroblocks that are not affected by the replacement content insertion. At 412, edge server 114 splices the re-encoded content with the content that was not re-encoded and delivers the video to client devices 104 in the geolocation area. For example, edge server 114 sends the video with the replacement content to client devices 104 that are identified in the geolocation group. In other embodiments, any client devices 104 within the geolocation group that requested the video receive the video with the replacement content.

Transcoder

Figure 5:
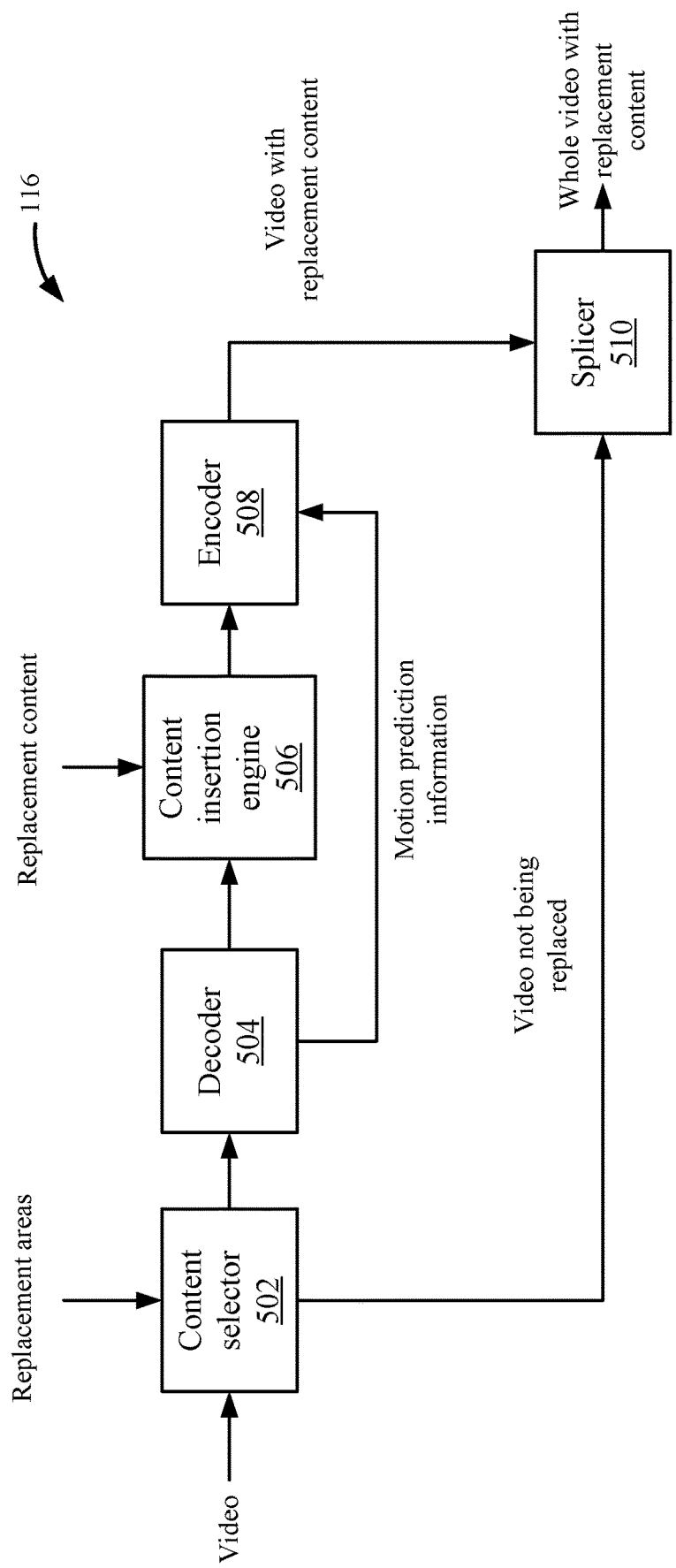
FIG. 5 depicts of an example a transcoder according to some embodiments.

FIG. 5 depicts a more detailed example of transcoder 116 according to some embodiments. Although this example of transcoder 116 is described, other configurations may be appreciated. Further, although selective decoding of portions of the video is described, it will be understood that the entire video may be decoded and then re-encoded with the inserted replacement content.

A content selector 502 receives the video and replacement areas. Content selector 502 can then select the frames of the video that correspond to the replacement areas. For example, frames in which replacement content should be inserted are forwarded to decoder 504. Also, content selector 502 forwards frames that will not have replacement content inserted to a splicer 510.

Decoder 504 then decodes the portions of the video. As will be discussed in more detail below, decoder 504 may save some information from the decoding process, such as motion prediction information, that can be used by encoder 508. Other information that can be used by encoder 508 may also be saved, such as macroblock identifiers. This process will be described in more detail below.

Content insertion engine 506 receives the decoded video and the replacement content. Then, content insertion engine 506 inserts the replacement content in the decoded video. For example, the replacement content may only replace a small area, such as a small number of macroblocks in each frame. The other macroblocks in the frames remain the same as found in the original encoded video and are not replaced with any content.

After content insertion engine 506 performs the content replacement, encoder 508 then encodes the frames of video. In some embodiments, encoder 508 may re-use motion prediction information that was received from decoder 504 and encode the frames of video. For example, macroblocks that are not affected by the replacement content may re-use motion prediction information. This saves time in re-encoding the video as determining the motion prediction information may be a resource-intensive operation. Once the frames are encoded, encoder 508 sends the encoded video with the inserted replacement content to splicer 510. Splicer 510 then splices the encoded video with the replacement content with the encoded video that did not have any replacement content in it to create a video stream with portions that include the replacement content.

Figure 6:
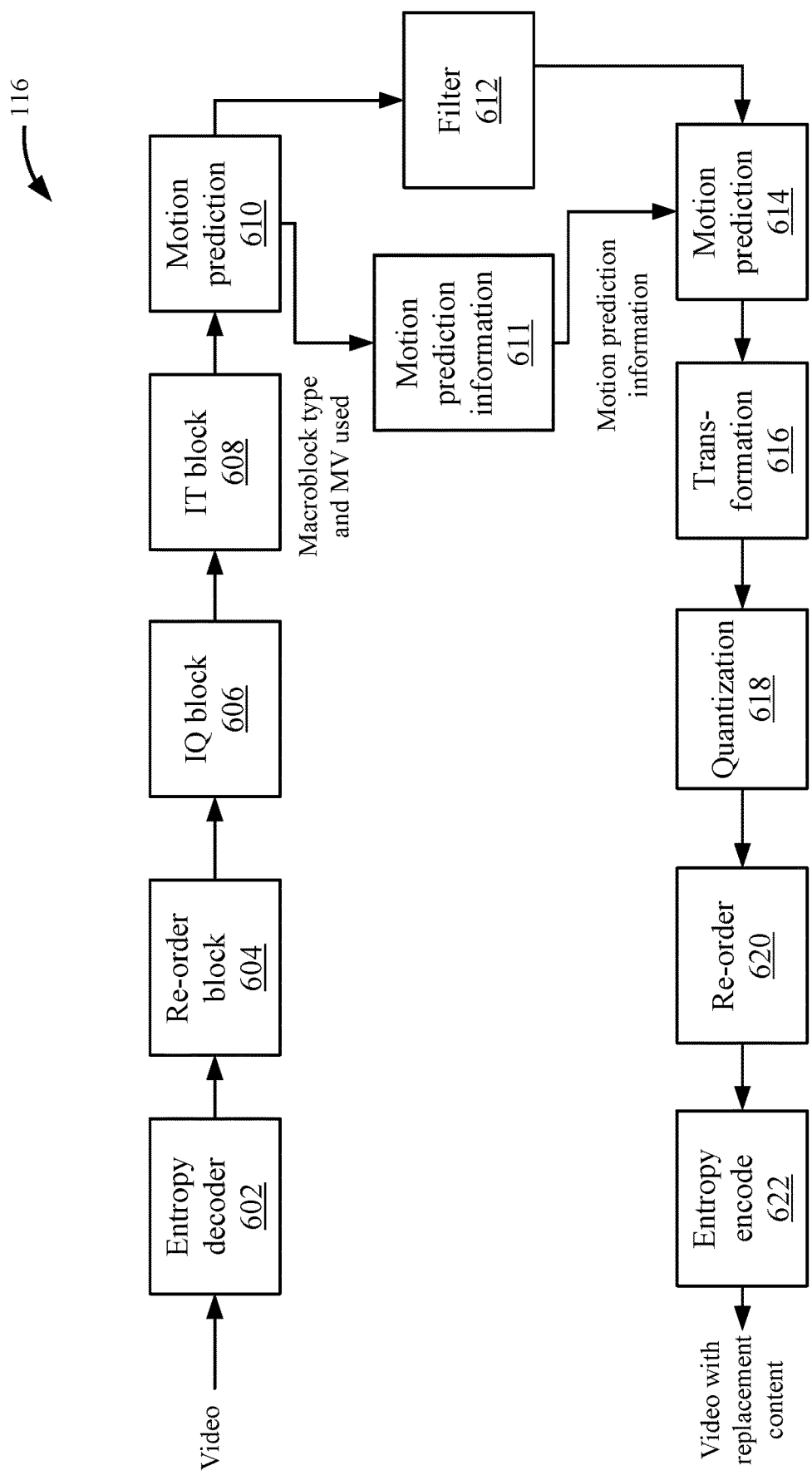
FIG. 6 depicts a more detailed example of the transcoder according to some embodiments.

Transcoder 116 may be implemented in different configurations. For example, depending on the protocol used, transcoder 116 may include different blocks that perform different functions. FIG. 6 depicts an example of transcoder 116 according to some embodiments. It will be recognized that some functions described may be different based upon the encoding protocol that is used.

Entropy decoder 602 receives the video and performs entropy decoding. Different entropy decoding methods may be used, such as context-adapter variable length coding (CAVLC) or context-adapted binary arithmetic coding (CABAC). A re-order block 604 may re-order the frames that are decompressed in a different order than their display order.

An inverse quantization (IQ) block 606 de-quantizes the quantized transform coefficients of the macroblocks. An inverse transformation (IT) block 606 receives the de-quantized transform coefficients, which are then inverse transformed.

Motion prediction block 610 then performs motion prediction. Motion prediction may include searching for a macroblock type and also calculating a motion vector. The macroblock type may be the type of macroblock that is used in the prediction, such as intra-frame, inter-frame and bi-direction inter-frame macroblock types. Inter-picture prediction is prediction between frames and intra-picture prediction uses macroblocks only in the same frame. The motion vectors for a macroblock point to another macroblock that is used to perform the prediction. For inter-picture prediction, the motion vector points to another macroblock in another frame and the intra-picture prediction, the motion vector points to another macroblock in the same frame.

Motion prediction block 610 then saves the motion prediction information, such as the macroblock type and motion vector information at 611. Motion prediction information 611 is stored in storage for the decoding process and later accessed by the encoding process. Filter 612 can then perform filtering that prevents blocking artifacts to provide a better visual appearance and compression efficiency. This completes the decoding process.

The encoding process of transcoder 116 is then performed. For example, motion prediction block 614 performs motion prediction for the macroblocks. Motion prediction block 614 can re-use the motion prediction information 611 from the decoding process. For the macroblocks that are not affected by the replacement content, motion prediction block 614 may re-use the macroblock type and/or motion vector. However, for the macroblocks that are affected by the replacement content, motion prediction block 614 performs the motion prediction process.

Figure 7:
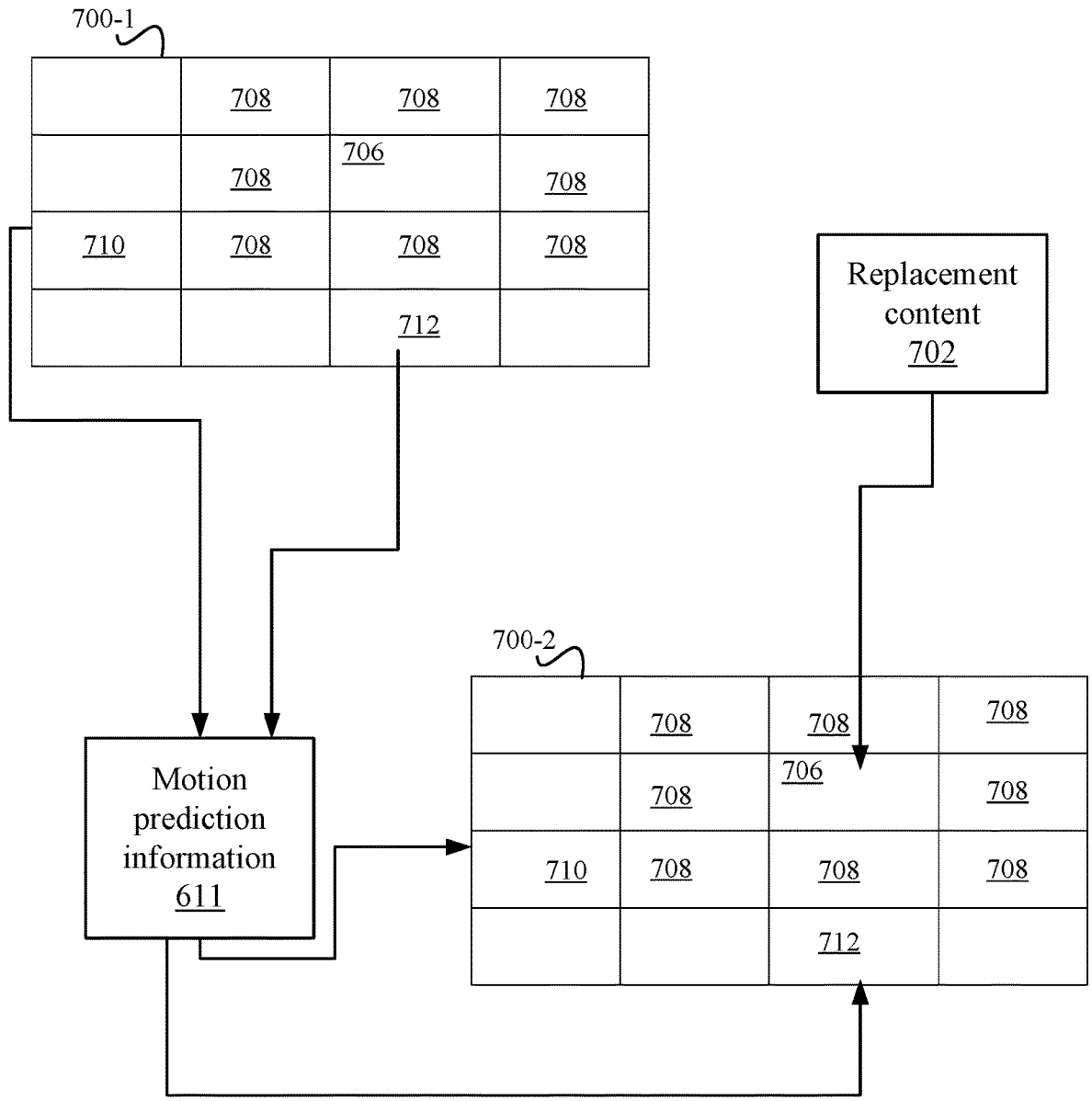
FIG. 7 depicts an example of performing the motion prediction process according to some embodiments.

FIG. 7 depicts an example of performing the motion prediction process according to some embodiments. A first frame 700-1 is a frame that does not include the replacement content. A macroblock 706 is to be replaced in frame 700-1. As shown, replacement content 702 is inserted into a frame 700-2 for macroblock 706. Motion prediction information 611 may be used for macroblocks that are not affected by the replacement content being inserted in frame 700-2. However, macroblocks that are affected by the replacement content insertion have their motion prediction information recalculated for the encoding process.

Macroblock 706 that includes the replacement content in frame 700-2 has its motion prediction information recalculated. However, this may not be the only macroblock that is affected by the replacement content. For example, macroblocks that are close to macroblock 706 may be affected by the replacement content. This is because the motion prediction information for macroblocks around macroblock 706 cannot be used if the motion prediction information is affected by the changed content in macroblock 706. One reason the motion prediction information may not be used is a macroblock type may change or the motion vector may change due to the inserted replacement content. Thus, the motion prediction information for macroblocks 708 that are around macroblock 706 may be affected and motion prediction block 614 may calculate which macroblocks are affected by the replacement content. Accordingly, motion prediction block 614 recalculates the motion prediction information for macroblocks 708 and also for macroblock 706.

When macroblocks are not affected by the change, motion prediction block 614 uses motion prediction information 611, such as motion prediction information for macroblocks 710 and 712, when re-encoding frame 700-2. Additionally, macroblocks other than macroblocks 706 and 708 may also re-use the motion prediction information from the decoding process although this is not shown.

Referring back to FIG. 6, after motion prediction, a transformation block performs a transform operation. Then, a quantization block 618 quantizes the transform coefficients and converts the transform coefficients into a finite number of possible values. A re-order block 620 may re-order the frames. Then, entropy encoder block 622 entropy encodes the quantized coefficients, which results in final compression bits that can be transmitted. The output of entropy encoder block 622 is the encoded video with the replacement content.

Accordingly, particular embodiments provide a transcoder 116 that can re-use motion prediction information from the decoding process. This increases the speed of the subsequent encoding process of transcoder 116 after insertion of the replacement content. The motion prediction block may determine which macroblocks are affected by the insertion of the replacement content and then re-use the motion prediction information for macroblocks that are not affected.

OTHER EXAMPLES

In other embodiments, edge server 114 may not perform the transcoding. Rather, origin server 112 may insert the replacement content and re-encode the video. The segments can then be sent to edge server 114, which can then forward the segments to client devices 104. However, performing the content replacement on edge server 114 may save bandwidth between origin server 112 and edge server 114. Bandwidth is saved because origin server 112 would have to send multiple streams of the video with the different replacement content. This may result in multiple streams of the video being sent.

In other embodiments, client device 104 may perform the content replacement. In this case, transcoder 116 may reside on client device 104 and perform the decoding and re-encoding.

CONCLUSION

Some embodiments use different replacement content based on the location. Accordingly, transcoder 116 determines which macroblocks are affected by the replacement content dynamically. Accordingly, for the same video, different edge servers 114 may be performing different decoding and encoding processes based on the different replacement content being inserted into the video.

When client devices 104 request a segment of the video, edge server 114 can return a segment that includes the replacement content. Edge server 114 may perform the replacement within the time required from when edge server 114 received the previous segment request to this request for the segment with the replacement content. To perform the encoding in that time, edge server 114 uses the optimization of not recalculating the motion prediction information when re-encoding the frames with the replacement content.

System

Figure 8:
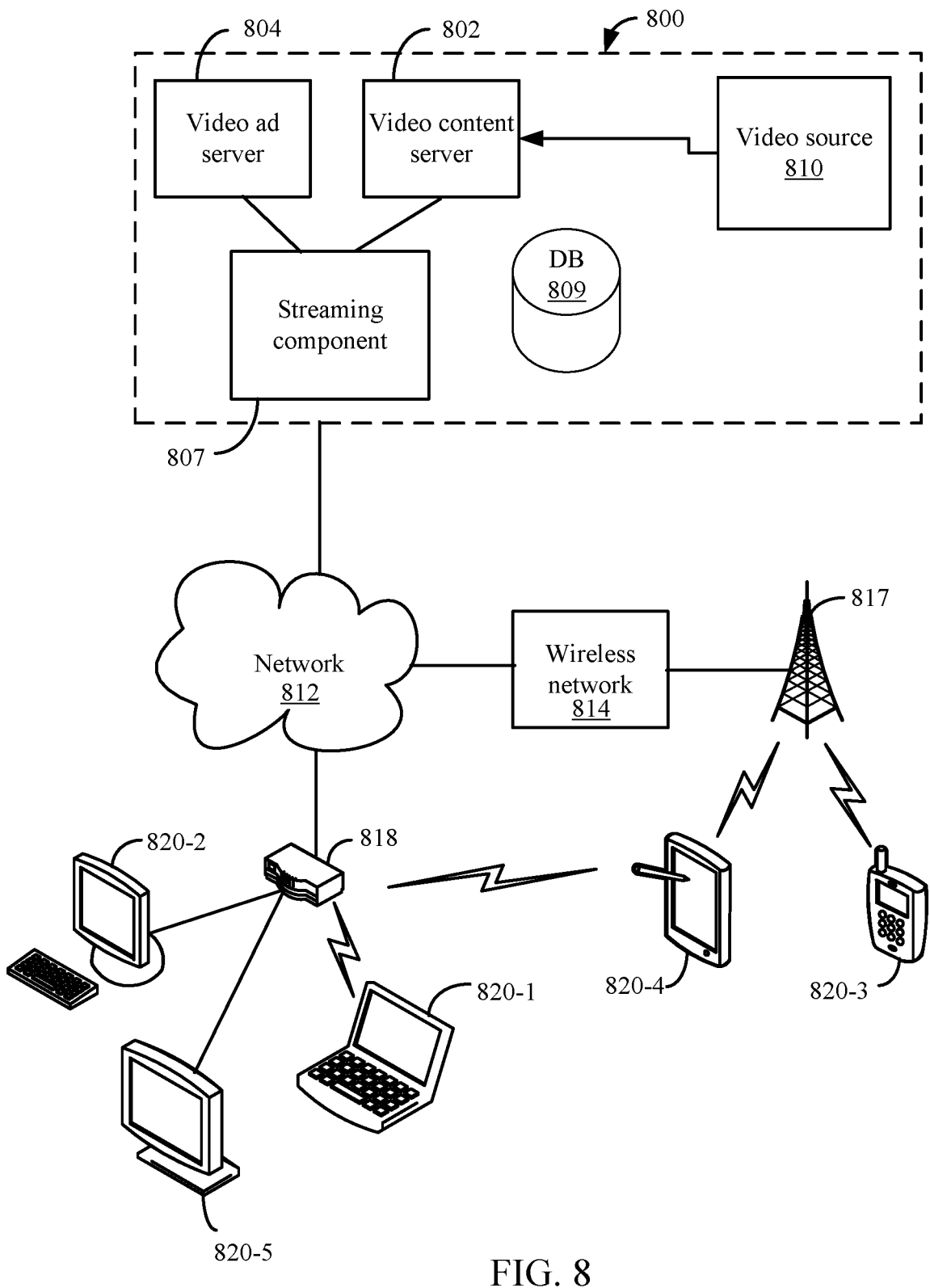
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
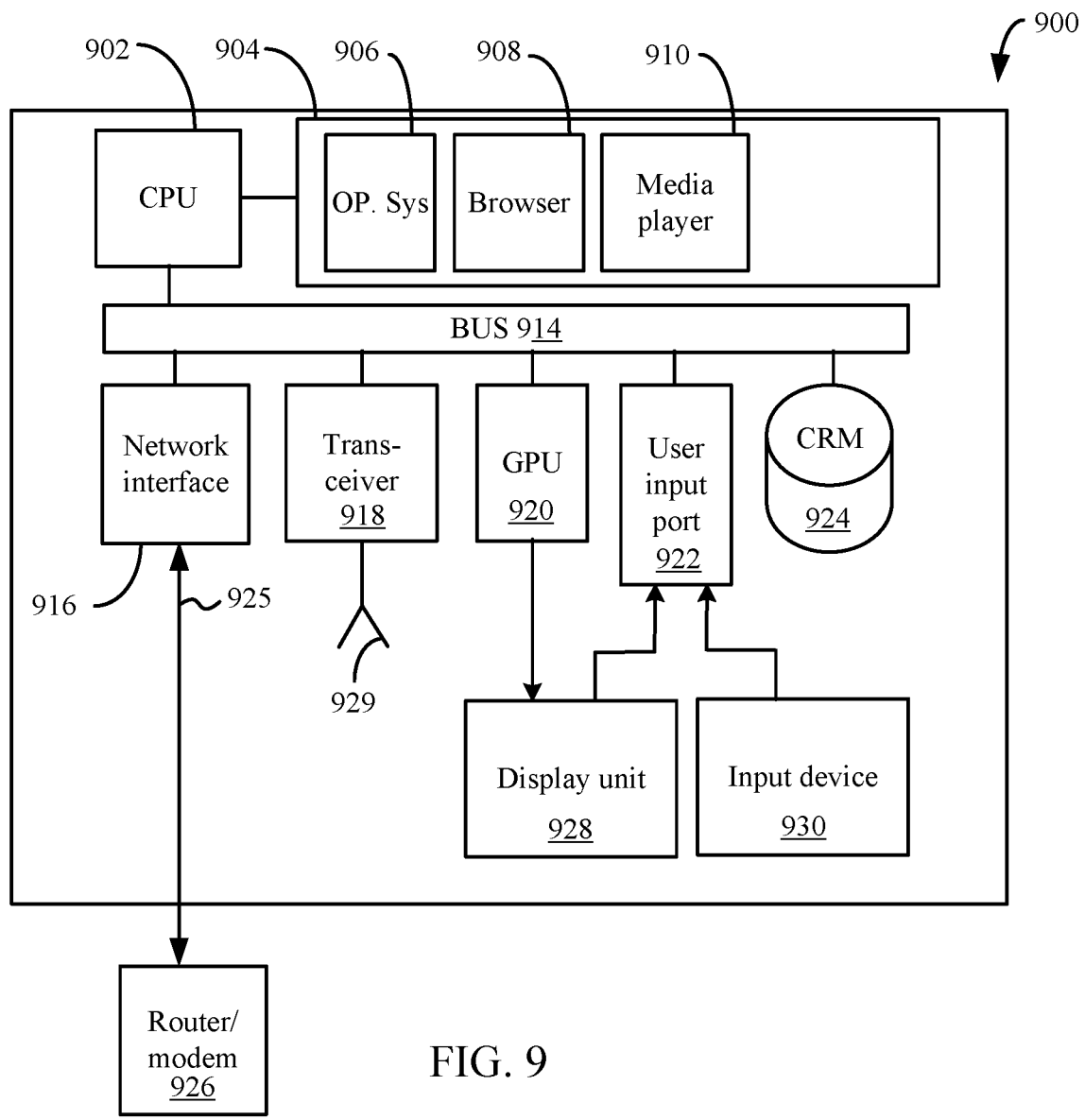
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium (CRM) in a storage device 924 may be connected to the bus 914 and store static information and instructions for the processor 902; for example, the storage device (CRM) 924 may store the modules 906, 908, and 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
  receiving, by a computing device, an encoded video;
  decoding, by the computing device, blocks in a frame of the encoded video in which replacement content will be inserted;
  analyzing, by the computing device, the blocks to determine first blocks of the frame that are affected by insertion of the replacement content and second blocks in the frame that are not affected by the insertion, wherein information from the decoding of the second blocks is saved; and
  encoding, by the computing device, the frame, wherein the replacement content is inserted to replace the first blocks in the encoding of the frame, and wherein the information from the decoding of the second blocks is reused when performing the encoding of the second blocks.

2. The method of claim 1, further comprising:
determining a location associated with a client device that requested to view the encoded video, wherein the location is used to select the replacement content.

3. The method of claim 2, wherein:
the location comprises a first location, and
the encoded video at a second location has different replacement content inserted in the encoded video to replace the first blocks.

4. The method of claim 2, further comprising:
receiving a geolocation group for the replacement content; and
determining that the location associated with the client device is within the geolocation group.

5. The method of claim 4, wherein the geolocation group is determined based on analyzing active users that requested the encoded video.

6. The method of claim 2, further comprising:
receiving a geolocation group for different replacement content; and
determining that the location associated with the client device is not within the geolocation group, wherein the different replacement content is not inserted in the encoded video to replace the first blocks.

7. The method of claim 1, wherein:
the information from decoding the blocks comprises motion prediction information for at least some of the second blocks, and
the encoding of the second blocks reuses the motion prediction information for the at least some of the second blocks.

8. The method of claim 7, further comprising:
storing the motion prediction information for the second blocks.

9. The method of claim 1, wherein:
the information from decoding the blocks includes a block type for at least some of the second blocks, and
the encoding of the second blocks reuses the block type for the at least some of the second blocks.

10. The method of claim 1, wherein:
the information from decoding the frame includes a motion vector for at least some of the second blocks, and
the encoding of the second blocks reuses the motion vector for the at least some of the second blocks.

11. The method of claim 1, wherein:
the information from decoding the blocks comprises macroblock identifiers for the second blocks, and
the encoding of the second blocks reuses the macroblock identifiers for the at least some of the second blocks.

12. The method of claim 1, wherein encoding the frame comprises:
inserting the replacement content in the first blocks of the frame; and
encoding the first blocks and the second blocks of the frame.

13. The method of claim 1, further comprising:
splicing the frame with the replacement content with other frames that do not include replacement content; and
sending the frame and the other frames to a client device.

14. The method of claim 1, wherein analyzing the blocks comprises:
selecting a first portion of the first blocks based on the replacement content replacing the first portion of the first blocks; and
selecting a second portion of the first blocks based on the second portion of the first blocks having motion prediction information that is affected by the replacing of the first portion of the first blocks.

15. The method of claim 1, wherein the encoded video is received from an origin server with information for the replacement content.

16. The method of claim 1, further comprising:
receiving a replacement content area for the replacement content; and
selecting the frame and the second blocks of the encoded video based on the replacement content area.

17. A non-transitory computer-readable storage medium containing instructions, that when executed, control a computer system to be configured for:
receiving an encoded video;
decoding blocks in a frame of the encoded video in which replacement content will be inserted;
analyzing the blocks to determine first blocks of the frame that are affected by insertion of the replacement content and second blocks in the frame that are not affected by the insertion, wherein information from the decoding of the second blocks is saved; and
encoding the frame, wherein the replacement content is inserted to replace the first blocks in the encoding of the frame, and wherein the information from the decoding of the second blocks is reused when performing the encoding of the second blocks.

18. The non-transitory computer-readable storage medium of claim 17, the information from decoding the blocks comprises motion prediction information for at least some of the second blocks, and
the encoding of the second blocks reuses the motion prediction information for the at least some of the second blocks.

19. The non-transitory computer-readable storage medium of claim 17, wherein:
the information from decoding the frame includes a motion vector for at least some of the second blocks, and
the encoding of the second blocks reuses the motion vector for the at least some of the second blocks.

20. An apparatus comprising:
one or more computer processors; and
a non-transitory computer-readable storage medium comprising instructions, that when executed, control the one or more computer processors to be configured for:
receiving an encoded video;
decoding blocks in a frame of the encoded video in which replacement content will be inserted;
analyzing the blocks to determine first blocks of the frame that are affected by insertion of the replacement content and second blocks in the frame that are not affected by the insertion, wherein information from the decoding of the second blocks is saved; and
encoding the frame, wherein the replacement content is inserted to replace the first blocks in the encoding of the frame, and wherein the information from the decoding of the second blocks is reused when performing the encoding of the second blocks.

* * * * *